US008284712B2

United States Patent
Ding et al.

(10) Patent No.: US 8,284,712 B2
(45) Date of Patent: Oct. 9, 2012

(54) IMPLEMENTING METHOD AND SYSTEM FOR UE REDIRECTION SERVICE OF SHARING PUI

(75) Inventors: Zhaoming Ding, Shenzhen (CN); Zhenwu Hao, Shenzhen (CN); Zhiming Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 479 days.

(21) Appl. No.: 12/668,414

(22) PCT Filed: Jul. 18, 2008

(86) PCT No.: PCT/CN2008/071696
§ 371 (c)(1),
(2), (4) Date: Jan. 8, 2010

(87) PCT Pub. No.: WO2009/010017
PCT Pub. Date: Jan. 22, 2009

(65) Prior Publication Data
US 2010/0189248 A1    Jul. 29, 2010

(30) Foreign Application Priority Data
Jul. 19, 2007  (CN) .......................... 2007 1 0129490

(51) Int. Cl.
*H04W 4/00* (2009.01)
(52) U.S. Cl. .......................... 370/325; 370/331; 370/338
(58) Field of Classification Search .................. 370/328, 370/325, 331, 338, 225
See application file for complete search history.

(56) References Cited

U.S. PATENT DOCUMENTS

| 2007/0076691 | A1 | 4/2007 | Varney et al. | |
| 2009/0103518 | A1* | 4/2009 | Yu et al. | 370/352 |
| 2010/0034168 | A1* | 2/2010 | Mahdi | 370/331 |
| 2010/0085914 | A1* | 4/2010 | Kunniyur et al. | 370/328 |
| 2010/0150137 | A1* | 6/2010 | Lu et al. | 370/352 |
| 2010/0272088 | A1* | 10/2010 | Buckley | 370/338 |
| 2012/0158964 | A1* | 6/2012 | Van Elburg et al. | 709/225 |

FOREIGN PATENT DOCUMENTS

| CN | 1852293 | | 10/2006 |
| CN | 1863205 | A | 11/2006 |

OTHER PUBLICATIONS

3GPP TS 22.259 V8.3.0, 3$^{rd}$ Generation Partnership Project; Technical Specification Group Service and System Aspects; Service requirements for Personal Network Management (PNM); Stage 1 (Release 8), Jun. 2006, pp. 1-27.

* cited by examiner

*Primary Examiner* — Albert T Chou
(74) *Attorney, Agent, or Firm* — Woodcock Washburn LLP

(57) ABSTRACT

The present invention discloses a method for implementing a redirection service for UEs sharing a PUI in an IMS, comprising: when a UE in a PN registers at a PNM AS, the PNM AS fetching the UE Identity and establishing a corresponding relationship between the identity and the PUI; when determining to route an initial request message of a terminating call of a UE in the PN routed by an original S-CSCF to a configured UE sharing the PUI, the PNM AS adding the configured UE Identity into a redirected initial request message and sending it to the original S-CSCF which forwards the message to a redirection S-CSCF; and the redirection S-CSCF uniquely locating the configured UE according to the identity or both the identity and the PUI in the message. The present invention can redirect a session initial request to a configured UE sharing a PUI with other UEs.

20 Claims, 2 Drawing Sheets

IMPLEMENTING METHOD AND SYSTEM FOR UE REDIRECTION SERVICE OF SHARING PUI

CROSS-REFERENCE TO RELATED APPLICATIONS

This application is the National Stage of International Application No. PCT/CN2008/071696, filed Jul. 18, 2008, which claims the benefit of Chinese Patent Application No. 200710129490.5, filed Jul. 19, 2007, the disclosures of which are incorporated herein by reference in their entireties for all purposes.

TECHNICAL FIELD

The present invention relates to mobile communication, and specifically to a method and system for implementing a redirection service for user equipments sharing a Public User Identity (PUI) by applying an IP Multimedia Core Network Subsystem (IMS) in Personal Network Management (PNM).

BACKGROUND OF THE INVENTION

A conventional User Equipment (UE) is a single integrated device integrated with a wireless access means, used for mobile communication services. At present, many users each own a couple of UEs with different capabilities, such as UEs supporting audio, video, images or other special media services. A couple of UEs owned by a user constitute a Person Network (PN) by interconnecting with one another, and PNM is a service implementing management of UEs in a PN and including a redirection service for UEs in the PN. The UEs in this disclosure include all terminals that can constitute a PN and access an IMS, and are also referred to as mobile stations, user equipments, or the like in different systems.

The PNM service is also required to be supported in the IMS. A system framework of the IMS is shown in FIG. 1, comprising a UE 101, an Interrogating Call Session Control Function (I-CSCF) 102, a Serving Call Session Control Function (S-CSCF) 103, a Home Subscriber Server (HSS) 104, and a Personal Network Management Application Server (PNM AS) and Network Application Function (NAF) 105. In addition, the IMS may involve other functional entities such as a Proxy Call Session Control Function (P-CSCF) during a session. Wherein PNM AS/NAF 105 is a new functional entity introduced into the IMS domain, and specifically:

The PNM AS is used to receive a terminating call service session establishment request (also referred to as initial request) from the S-CSCF 103, determine whether to execute a session redirection service according to data configured by the user, return a redirected terminating call service session establishment request if the user has set a configured UE, and connect to a functional entity registered by the configured UE through a Mw/MM interface. In addition, the user can configure service data in the PNM AS through an Ut interface. To ensure security of configuration data, it is required to firstly connect a configuration request to the NAF (may be bound with the PNM AS 103), then the NAF authenticates and authorizes the user's identity, and then the authenticated and authorized configuration request is forwarded to the PNM AS by the NAF.

According to requirements of the redirection service for UEs in a PN, a couple of UEs owned by a user are required to firstly register themselves in the IMS domain, and then implement their registrations in the PN through the PNM. After registration of the UEs in the PN, the user can perform service configuration for the UEs already registered in the PN via the Ut interface so that a terminating call service request to any UE for which the redirection service is activated in the PN is forwarded to a configured UE. The user may set a couple of configured UEs, each of which has a different priority. In addition, a method for configuring a special UE and implementing a redirection service for it needs to considered. The special UE is a UE whose PUI is simultaneously shared by other UEs, and the PUI is also referred to as shared PUI.

In the current specifications, a third party registration in the IMS domain is used to implement registration of a UE in a PN. When a user registers in the IMS domain, the S-CSCF matches with initial filter criteria to trigger a third party registration at the PNM AS. After the registration in the PN is finished, capability information of the UE is stored in a database of the PNM AS, and a registration state of a PUI associated with the UE is modified as well. An example of a relationship between the PUI and a Private User Identity (PVI) of the UE and the registration state of the PUI of the UE is shown in table 1. In the table, user equipment-1 i.e. UE-1 owns a PVI_1, which associates with 2 PUIs which are PUI_1_1 and PUI_1_2. The PUI_1_2 is also associated with a PVI_2 of a user equipment-2 i.e. UE-2, that is, the PUI_1_2 is shared by the UE-1 and the UE-2 simultaneously. PN-ID is an identity of the PN, and is meaningful only in the PNM AS.

TABLE 1

|  | PVI | PUI | Registration state |
|---|---|---|---|
| PN-ID #n | PVI_1(UE-1) | PUI_1_1 | YES |
|  |  | PUI_1_2 | YES |
|  | PVI_2(UE-2) | PUI_1_2 | YES |
|  | PVI_3(UE-3) | PUI_3_1 | YES |
|  | PVI_4(UE-4) | PUI_4_1 | NO |
| PN-ID #n + 1 |  |  |  |

After registration, suppose that the registration states in the database of the PNM AS are as shown in table 1, in which UE-1 is registered in the PN with the PUI_1_1 and PUI_1_2, UE-2 and user equipment-3, i.e. UE-3, complete the registrations in the PN with the PUI_1_2 and the PUI_3_1 respectively, and UE-4 is not registered in the PN. The redirection service for UEs is used to forward a terminating call request to a UE configured with the service to a configured UE in the PN.

To illustrate the processing flow in the current specifications, a case in which there is no shared PUI is introduced at first, that is, assuming the UE-1 only has the PUI_1_1 as its PUI, and a configured UE is the UE-2 associated with the PUI_1_2. In this case, the redirection service (also referred to as session redirection service) is performed when the UE-1 is called, and a flow of the redirection service in the IMS domain is shown in FIG. 2, comprising the following steps of:

201) S-CSCF#1 receiving an initial request message sent to the UE-1, the message containing a request Uniform Resource Identifier (URI) associated with the PUI_1_1 of the UE-1;

202) S-CSCF#1 determining that it is an initial request for a terminating call of a UE, and invoking a terminating call service control logic to process the initial request for a terminating call of the UE-1;

Wherein the processing by the terminating call service control logic comprises evaluating initial Filter Criteria (iFC), and S-CSCF#1 routes the initial request to the PNM AS in the case that the iFC matches;

203) S-CSCF#1 routing the initial request message to the PNM AS according to a result of the processing of the initial request for a terminating call of the UE-1 by the terminating call service control logic;

204) the PNM AS executing a PNM redirection service control logic according to configuration data in the PN of the user, and determining whether to route the initial request to the configured UE, i.e. the UE-2 associated with the PUI_1_2, in the PN;

205) if a result of the processing by the PNM redirection service control logic is to redirect the initial request to the UE-2 by the PNM AS, then the PNM AS sending a redirected initial request message to the S-CSCF#1, the redirected initial request message containing a request URI of the UE-2, i.e. a request URI of the PUI_1_2;

206) S-CSCF#1 taking the redirected initial request message as an originating call message of a UE, and forwarding it to S-CSCF#2 at which the UE-2 is registered;

Wherein, S-CSCF#1 and S-CSCF#2 may be a same entity or different entities;

207) S-CSCF#2 taking the redirected initial request message received as a terminating call message to a UE, and invoking a terminating call service control logic to process the UE associated with the PUI_1_2, herein it can directly be determined that the initial request message is an initial request for a terminating call of the UE-2;

208) S-CSCF#2 processing the redirected initial request based on a standard call establishment flow.

It can be seen from the above flow that the redirection service of the PNM in the IMS domain is lack of consideration of a case in which there is a shared PUI. If a configured UE set by the user is one of the UEs with a shared PUI, for example, UEs associated with the PUI_1_2 are UE-1 and UE-2, and the configured UE is the UE-2, because only information on the PUI_1_2 is contained in the redirected initial request message, S-CSCF#2 cannot uniquely locate the configured UE-2 according to this PUI in the step 208 based on the current specifications, but may use a fork technique to ring UEs serially or in parallel, or find a suitable UE therein according to caller preferences.

If a user wants to designate one of his/her UEs as a configured UE during configuration, and a couple of UEs associated with a shared PUI are all capable of supporting services configured in a PN of the user, then it is impossible to redirect a session initial request to the configured UE relying on the current specifications.

It can be seen from the above analysis that the current redirection service technique of the PNM in the IMS domain does not meet a redirection service requirement of UEs associated with a shared PUI, which is disadvantageous when a user wishes to uniquely designate a configured UE. Moreover, a capability requirement for UEs associated with a shared PUI in implementation of a redirection service is not considered either.

SUMMARY OF THE INVENTION

The technical problem to be solved by the present invention is to provide a method and system for implementing a redirection service for User Equipments (UEs) sharing a Public User Identity (PUI), capable of redirecting a session initial request to a configured UE in a couple of UEs associated with a shared PUI.

In order to solve the above technical problem, the present invention provides a method for implementing a redirection service for User Equipments (UEs) sharing a Public User Identity (PUI), used to implement a redirection service for UEs in a Personal Network (PN) in an Internet Protocol Multimedia Core Network Subsystem (IMS), comprising:

when a UE in the PN registers in the PN through a Personal Network Management Application Server (PNM AS), the PNM AS fetching an identity of the UE and establishing a corresponding relationship between the identity and the PUI of the UE, the identity alone or together with the PUI being able to uniquely locate the UE;

in the redirection service, when determining to route an initial request message of a terminating call of a UE in the PN routed by an original Serving Call Session Control Function (S-CSCF) to a configured UE with a shared PUI according to a configuration of the PN, the PNM AS adding an identity of the configured UE into a redirected initial request message and sending the redirected initial request message to the original S-CSCF, and the original S-CSCF forwarding the redirected initial request message to a redirection S-CSCF at which the configured UE is registered; and after receiving the redirected initial request message, the redirection S-CSCF uniquely locating the configured UE according to the identity or both the identity and the PUI therein, and invoking a terminating call service control logic to process the initial request for a terminating call of the configured UE.

Moreover, the above method may further have the following feature: the process of the UE registering in an IMS domain and the PN further divides into the following steps of:

when the UE registers in the IMS domain, after the S-CSCF receives a REGISTER request message, the S-CSCF fetching and binding the PUI, the identity and a registration address of the UE, matching with initial filter criteria, and triggering a third party REGISTER request to the PNM AS;

after receiving the third party REGISTER request, the PNM AS sending a subscribe request for a registration event packet for registering a PUI to the S-CSCF;

after receiving the subscribe request, the S-CSCF returning a notify message to the PNM AS, the message containing a Private User Identity (PVI), the PUI and the identity of the UE; and after receiving the notify message, the PNM AS establishing a corresponding relationship among the PVI, PUI and identity of the UE.

Moreover, the above method may further comprise:

when invoking the terminating call service control logic to process the initial request for a terminating call of the configured UE, the redirection S-CSCF determining a registration address of the configured UE according to the identity or both the identity and the PUI, and sending the redirected initial request message to the registration address of the configured UE in a subsequent call establishment flow.

Moreover, the above method may further comprise:

the identity of the UE being a Globally Routable User Agent Uniform Resource Identifier (GRUU) of the UE;

when adding the identity into the redirected initial request message, the PNM AS modifying a request Uniform Resource Identifier (URI) therein to the GRUU of the configured UE; and when processing the initial request for a terminating call of the configured UE, the redirection S-CSCF extracting the PUI of the configured UE from the GRUU and verifying validity of the PUI of the configured UE, and determining the registration address of the configured UE according to the GRUU.

Moreover, the above method may further comprise:

the identity of the UE being a registration address of the UE;

when adding the identity into the redirected initial request message, the PNM AS adding the registration address of the configured UE into a head field of the redirected initial request message, and meanwhile modifying a request Uniform Resource Identifier (URI) in the redirected initial request message to a request URI of the configured UE; and when processing the initial request for a terminating call of the configured UE, the redirection S-CSCF directly taking a registration address in the redirected initial request message as the registration address of the configured UE, or determining the registration address of the configured UE according to both the PUI and the registration address in the initial request message.

Moreover, the above method may further comprise:

the identity of the UE being a personal mobile device identifier of the UE;

when determining to route the initial request message to the configured UE, the PNM AS adding the personal mobile device identifier of the configured UE into a head field of the redirected initial request message, and meanwhile modifying a request Uniform Resource Identifier (URI) in the redirected initial request message to a request URI of the configured UE;

when processing the initial request for a terminating call of the configured UE, the redirection S-CSCF determining the registration address of the configured UE according to the PUI and the personal mobile device identifier of the configured UE in the redirected initial request message.

The present invention also provides a system for implementing a redirection service for User Equipments (UEs) sharing a Public User Identity (PUI), comprising UEs, a Serving Call Session Control Function (S-CSCF) in an Internet Protocol Multimedia Core Network Subsystem (IMS), and a Personal Network Management Application Server (PNM AS) connected to the S-CSCF, wherein, the S-CSCF comprises:

a redirection trigger unit, used to invoke a terminating call service control logic to process an initial request message of a terminating call of a UE in a Personal Network (PN), to match with initial filter criteria, and to route the initial request message to the PNM AS; and a redirection processing unit, used to uniquely locate a configured UE according to an identity or both the identity and a PUI in a redirected initial request message after receiving the redirected initial request message, and to invoke the terminating call service control logic to process the initial request for a terminating call of the configured UE;

the PNM AS comprises:

a storage unit, used to store a Private User Identity (PVI), a PUI, an identity and registration state information of a UE in a PN, as well as indication information of a configured UE in the PN; and a redirection control unit, used to add an identity of a configured UE into a redirected initial request message and send the redirected initial request message to an original S-CSCD when determining to route an initial request message of a terminating call of a UE in a PN routed by the original S-CSCF to the configured UE with a shared PUI according to a configuration of the PN.

Moreover, the above system may further have the following feature:

the S-CSCF further comprises a first registration unit used to trigger a third party registration of a UE at the PNM AS when registering the UE in an IMS domain, and to send a PVI, PUI and identity of the UE to the PNM AS after receiving a subscribe request from the PNM AS; and the PNM AS further comprises a second registration unit used to send a subscribe request for a registration event packet for registering a PUI to the S-CSCF after receiving the third party REGISTER request from the S-CSCF, and to establish a corresponding relationship among the PVI, PUI and identity of the UE in the storage unit after receiving a notify message returned by the PNM AS.

Moreover, the above system may further have the following feature:

the identity of the UE is a Globally Routable User Agent Uniform Resource Identifier (GRUU) of the UE;

when adding the identity into the redirected initial request message, the redirection control unit modifies a request Uniform Resource Identifier (URI) therein to a GRUU of the configured UE; and when processing the initial request for a terminating call of the configured UE, the redirection processing unit extracts the PUI of the configured UE from the GRUU and verifies validity of the PUI of the configured UE, and determines a registration address of the configured UE according to the GRUU.

Moreover, the above system may further have the following feature:

the identity of the UE is a registration address of the UE;

when adding the identity into the redirected initial request message, the redirection control unit adds the registration address of the configured UE into a head field of the redirected initial request message, and meanwhile modifies a request Uniform Resource Identifier (URI) in the redirected initial request message to a request URI of the configured UE;

when processing the initial request for a terminating call of the configured UE, the redirection processing unit directly takes a registration address in the redirected initial request message as the registration address of the configured UE, or determines the registration address of the configured UE according to both the PUI and the registration address in the initial request message.

Moreover, the above system may further have the following feature:

the identity of the UE is a personal mobile device identifier of the UE;

when adding the identity into the redirected initial request message, the redirection control unit adds the personal mobile device identifier of the configured UE into a head field of the redirected initial request message, and meanwhile modifies a request Uniform Resource Identifier (URI) in the redirected initial request message to a request URI of the configured UE;

when processing the initial request for a terminating call of the configured UE, the redirection processing unit determines a registration address of the configured UE according to the PUI and the personal mobile device identifier of the configured UE in the redirected initial request message.

The present invention further provides a method for implementing a redirection service for User Equipments (UEs) sharing a Public User Identity (PUI), using a unique identity to differentiate each UE with the shared PUI, comprising steps of:

1.1) in a registration process of a UE, a Personal Network Management Application Server (PNM AS) receiving a Private User Identity (PVI), a PUI and an identity of the UE and establishing a corresponding relationship among the PVI, PUI and identity of the UE;

1.2) the PNM AS adding the identity into a redirected initial request message in a session redirection process; and 1.3) a redirection Serving Call Session Control Function (S-CSCF) receiving the redirected initial request message and uniquely locating a configured UE according to the identity.

Moreover, the above method may further have the following feature:

the identity is generated by a network side and stored in the UE; or the identity is generated by the UE and stored in the UE.

Moreover, the above method may further have the following feature:

the identity is a Globally Routable User Agent Uniform Resource Identifier (GRUU), a registration address of the UE, or a personal mobile device identifier.

Moreover, the above method may further comprise:

an original S-CSCF sending an initial request message to the PNM AS between the step 1.1) and the step 1.2);

the PNM AS executing session redirection according to a configuration of a Personal Network (PN) in the step 1.2); and the original S-CSCF forwarding the redirected initial request message in the step 1.3).

Compared with the current specifications, by applying an IMS in the PNM and adding a unique identity used to differentiate UEs into a redirected initial request message, the present invention addresses the redirection issue for a couple of UEs associated with a shared PUI, implements a session redirection service of a couple of UEs associated with a shared PUI, and meets the requirement of a UE redirection service of the PNM in the IMS domain when there exists a shared PUI.

PREFERRED EMBODIMENTS OF THE INVENTION

The present invention assigns an identity to a UE in a PN, and the identity can help an S-CSCF to locate a configured UE uniquely when a PUI is associated with a couple of UEs. In other words, the identity by itself or together with a PUI can be used to uniquely locate a UE. By adding the identity into a redirected initial request message, the redirection issue for a couple of UEs associated with a shared PUI can be addressed.

The present invention is described in detail below in conjunction with accompanying drawings and preferred embodiments.

Figure 1:
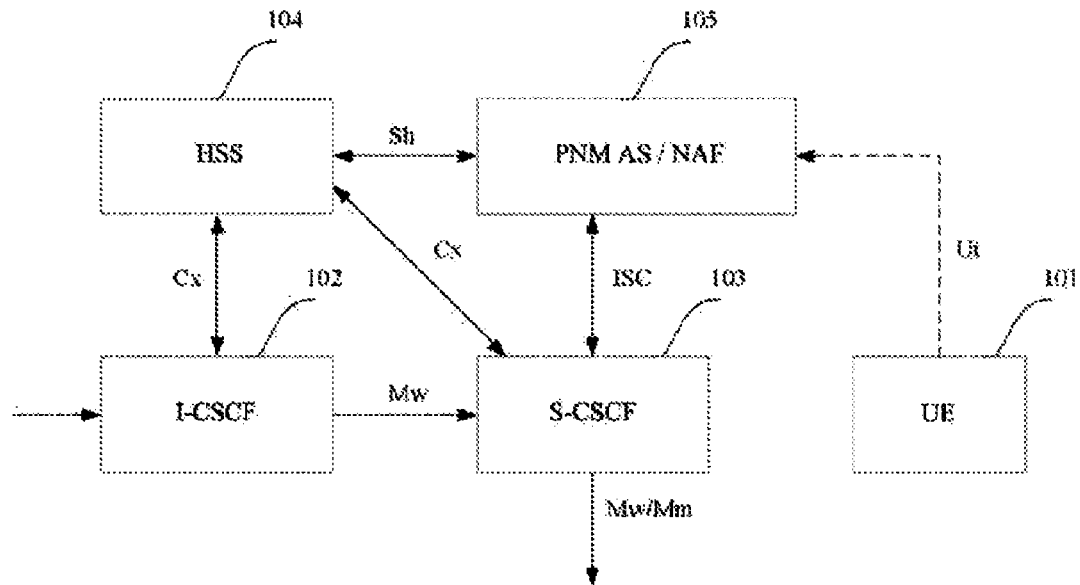
FIG. 1 is a diagram illustrating a system framework of an IMS supporting PNM.
Figure 2:
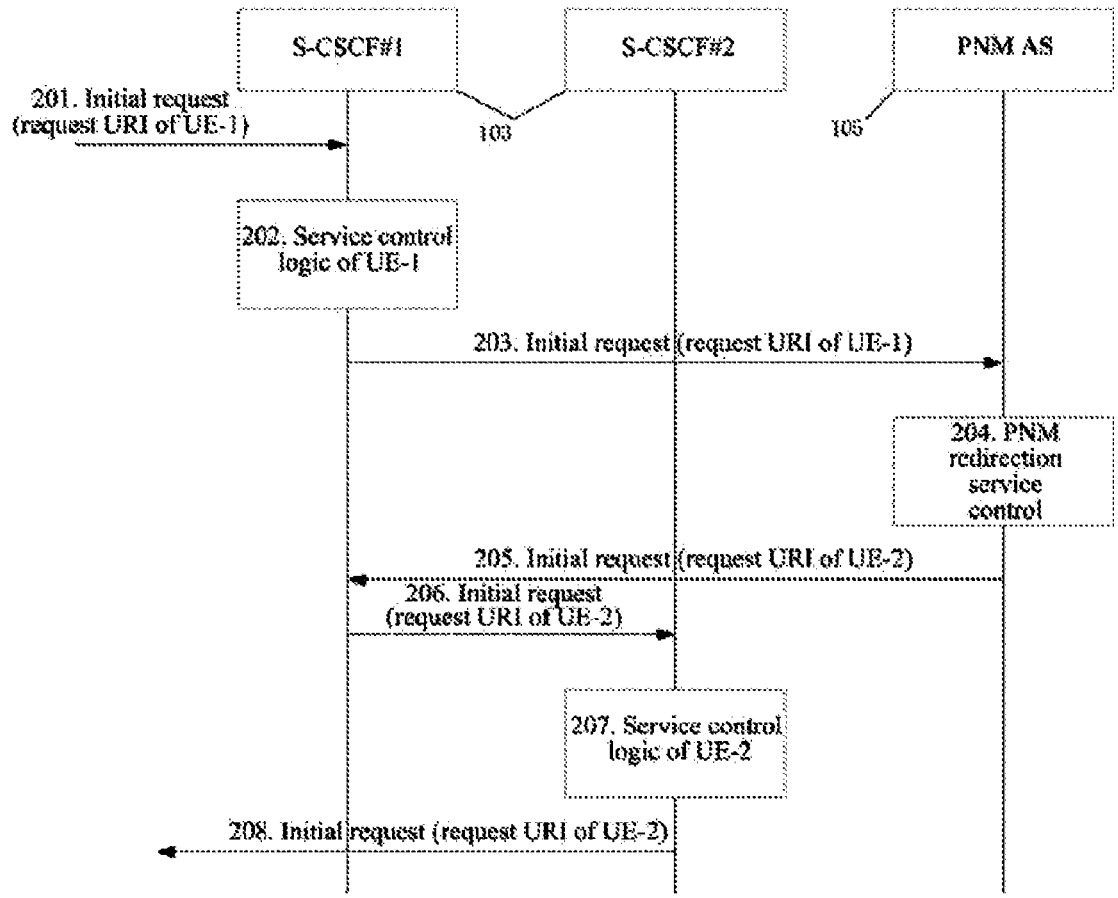
FIG. 2 is a flow chart illustrating the processing in a UE redirection service by PNM in the IMS domain according to the current specifications.

The present embodiment is based on the system shown in FIG. 1, but the functions of the S-CSCF and PNM AS therein are enhanced. Wherein, The S-CSCF comprises:

a first registration unit, used to trigger a third party registration of a UE in the PNM AS when the UE registers in the IMS domain, and to send a PVI, a PUI and an identity of the UE to the PNM AS after receiving a subscribe request from the PNM AS;

a redirection trigger unit, used to invoke a terminating call service control logic to process an initial request message of a terminating call of a UE in the PN, to match with initial filter criteria, and to route the initial request message to the PNM AS; and a redirection processing unit, used to uniquely locate a configured UE according to an identity, or both the identity and a PUI in a redirected initial request message after receiving the redirected initial request message, and to invoke the terminating call service control logic to process the initial request for a terminating call of the configured UE.

The PNM AS comprises:

a second registration unit, used to send a subscribe request for a registration event packet for registering a PUI to the S-CSCF after receiving a third party REGISTER request from the S-CSCF, and to establish a corresponding relationship among the PVI, PUI and identity of the UE in a storage unit after receiving a notify message returned by the PNM AS;

a storage unit, used to store the PVI, PUI, identity, and registration state information of a UE in the PN, as well as indication information of a configured UE in the PN;

a redirection control unit, used to add the identity of a configured UE into a redirected initial request message and send it to an original S-CSCF when determining to route an initial request message of a terminating call of a UE in the PN routed by the original S-CSCF to the configured UE with a shared PUI according to a configuration of the PN.

Specific identities used and processing of the identities by the redirection processing unit and redirection control unit are described in detail in the following flow, and are omitted here.

The flow of registration of a UE in the IMS domain and in the PN in this embodiment is as follows:

step 1, when the UE in the PN registers in the IMS domain, the S-CSCF receives a REGISTER request message, fetches and binds a PUI, an identity and a registration address of the UE, matches with initial filter criteria, and triggers a third party REGISTER request to the PNM AS;

step 2, after receiving the third party REGISTER request, the PNM AS sends a subscribe request for a registration event packet for registering a PUI to the S-CSCF;

step 3, after receiving the subscribe request, the S-CSCF returns a notify message to the PNM AS, the message containing the PVI, PUI and identity of the UE;

In the embodiment, the identity of the UE may be a personal mobile device identifier, a Globally Routable User Agent URI (GRUU) or the registration address (i.e. a contact address in a REGISTER message) of the UE. The identity (such as GRUU) may be generated by the network side and stored in the UE, or the identity (such as personal mobile device identifier) may be generated by the UE and stored in the UE. The present invention is not limited to these identities, and any identity that can uniquely identify a UE and be fetched by a S-CSCF may be used. As PVI is private, the PVI is not suitable to directly use as the identity of a UE in this disclosure.

The S-CSCF binds the identity, PUI and registration address of the UE during registration of the UE.

Step 4, after receiving the notify message, the PNM AS establishes a corresponding relationship among the PVI, PUI and identity of the UE, i.e., binding the PVI, PUI and identity of the UE.

After the registration in the PN is completed, the user performs service configuration for UEs already registered in the PN, which is similar to the current specifications except that besides the information of the PVI, PUI and the registration state of a UE in the PN, the identity of the UE needs to be bound with the information. The user performs service configuration for UEs already registered in the PN through the PNM AS, and designates a configured UE. In this embodiment, it is also assumed that the UE-2 with the shared PUI_1_2 is set as a configured UE.

Figure 3:
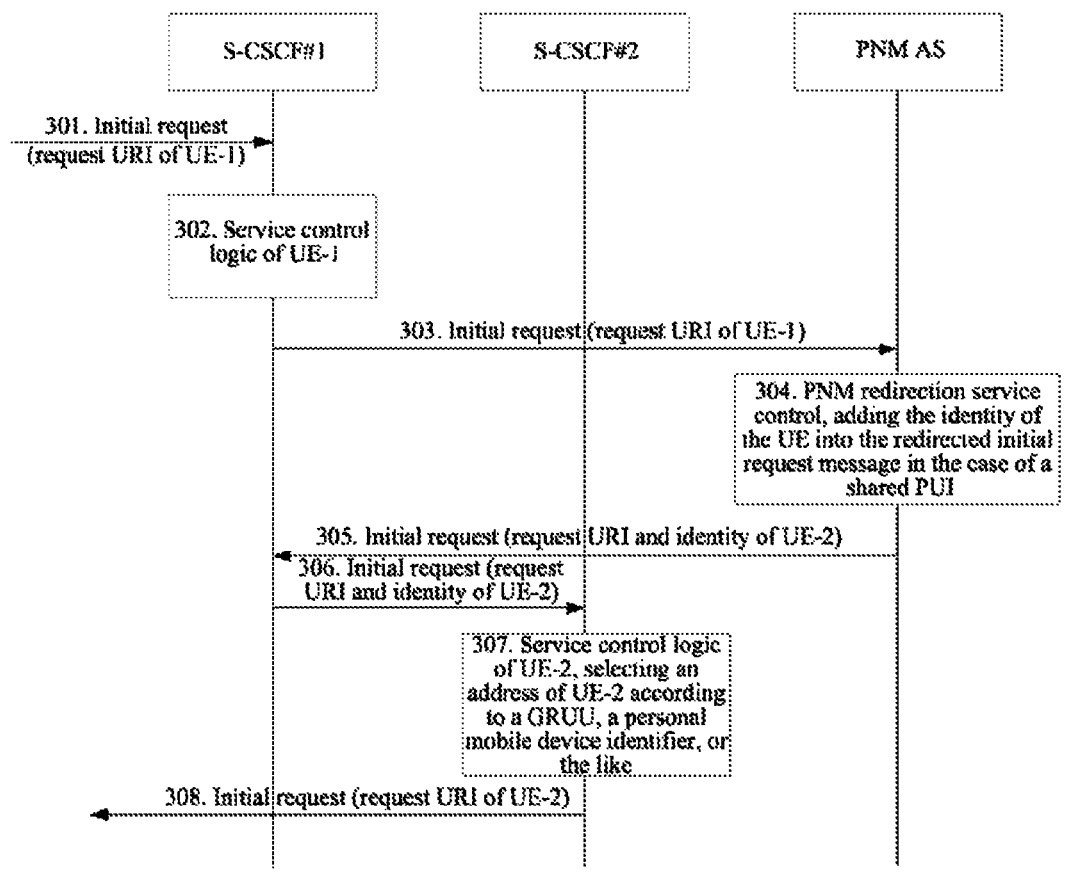
FIG. 3 is a flow chart illustrating the processing in a UE redirection service by PNM in the IMS domain according to an embodiment of the present invention.

In this embodiment, the flow of the processing of a UE redirection service by the PNM in the IMS domain is shown in FIG. 3, specifically comprising the following steps:

301~303), identical to the current specifications, corresponding to the steps of 201~203);

304) the PNM AS executing a PNM redirection service control logic according to configuration data of the PN to which a UE belongs, and if the PNM AS determines to route an initial request to a configured UE with a shared PUI in the PN, the PNM AS adding an identity of the configured UE into the initial request message which further contains a PUI of the configured UE;

In the embodiment, the configured UE is the UE-2, of which the PUI_1_2 is associated with the UE-1 and UE-2, so the identity of the UE-2 is required to be added into a redirected initial request message.

If the identity of the configured UE stored in the PNM AS is a GRUU in this case, then the request URI in the initial request message is modified to the GRUU of the UE-2.

If the identity of the configured UE stored in the PNM AS is a personal mobile device identifier or its registration address in this case, then the request URI in the modified initial request message is the request URI of the UE-2, i.e. request URI of the PUI_1_2, in addition, the personal mobile device identifier or registration address of the UE is carried in a head field (e.g. contact head field) of a return message.

If the configured UE has a couple of PUIs, one of the PUIs may be chosen.

305) the PNM AS sending the modified initial request message as a redirected initial request message to S-CSCF#1;

306) S-CSCF#1 (may be referred to as original S-CSCF) forwarding the redirected initial request message as a UE originating call message to S-CSCF#2 (may be referred to as redirection S-CSCF) at which the configured UE is registered;

307) S-CSCF#2 taking the received redirected initial request message as a UE terminating call message, invoking a terminating call service control logic to process the initial request for a terminating call of the configured UE, locating uniquely the configured UE according to the identity or both the PUI and identity in the initial request message, and determining the registration address of the configured UE;

In this process, S-CSCF#2 supports and identifies the identity of the configured UE in the initial request message, and if the identity is a GRUU, then S-CSCF#2 extracts a PUI from the GRUU and verifies validity of the PUI, and then determines an address corresponding to the GRUU, i.e. the registration address of the configured UE;

If the identity of the configured UE is the registration address of the UE, S-CSCF#2 takes directly the registration address in the initial request message as the registration address of the configured UE, or determines the registration address of the configured UE according to both the PUI and the registration address in the initial request message;

If the identity of the configured UE is the personal mobile device identifier of the UE, S-CSCF#2 determines the registration address of the configured UE according to the PUI and the personal mobile device identifier of the configured UE in the initial request message.

In addition, when processing the initial request for a terminating call of the configured UE according to the terminating call service control logic, S-CSCF#2 may continue to evaluate iFC, and if iFC matches, S-CSCF#2 may route the initial request to another AS, but will not route it to a PNM AS again, because the redirection service of the PNM has ever been triggered.

308) S-CSCF#2 processing the redirected initial request message based on a standard call establishment flow, and sending the initial request message to the registration address of the configured UE.

Industrial Applicability

By applying an IMS in PNM and using a unique identity associated with a UE, the method provided in the present invention addresses the redirection issue for a couple of UEs associated with a shared PUI and implements a session redirection service for the UEs associated with the shared PUI.

We claim:

1. A method for implementing a redirection service for User Equipments (UEs) sharing a Public User Identity (PUI), used to implement a redirection service for UEs in a Personal Network (PN) in an Internet Protocol Multimedia Core Network Subsystem (IMS), comprising:

when a UE in the PN registers in the PN through a Personal Network Management Application Server (PNM AS), the PNM AS fetching an identity of the UE and establishing a corresponding relationship between the identity and the PUI of the UE, the identity alone or together with the PUI being able to uniquely locate the UE;

in the redirection service, when determining to route an initial request message of a terminating call of a UE in the PN routed by an original Serving Call Session Control Function (S-CSCF) to a configured UE with a shared PUI according to a configuration of the PN, the PNM AS adding an identity of the configured UE into a redirected initial request message and sending the redirected initial request message to the original S-CSCF, and the original S-CSCF forwarding the redirected initial request message to a redirection S-CSCF at which the configured UE is registered; and after receiving the redirected initial request message, the redirection S-CSCF uniquely locating the configured UE according to the identity or both the identity and the PUI therein, and invoking a terminating call service control logic to process the initial request for a terminating call of the configured UE.

2. The method of claim 1, wherein the process of the UE registering in an IMS domain and the PN further divides into the following steps of:

when the UE registers in the IMS domain, after the S-CSCF receives a REGISTER request message, the S-CSCF fetching and binding the PUI, the identity and a registration address of the UE, matching with initial filter criteria, and triggering a third party REGISTER request to the PNM AS;

after receiving the third party REGISTER request, the PNM AS sending a subscribe request for a registration event packet for registering a PUI to the S-CSCF;

after receiving the subscribe request, the S-CSCF returning a notify message to the PNM AS, the message containing a Private User Identity (PVI), the PUI and the identity of the UE; and after receiving the notify message, the PNM AS establishing a corresponding relationship among the PVI, PUI and identity of the UE.

3. The method of claim 1, further comprising:

when invoking the terminating call service control logic to process the initial request for a terminating call of the configured UE, the redirection S-CSCF determining a registration address of the configured UE according to the identity or both the identity and the PUI, and sending the redirected initial request message to the registration address of the configured UE in a subsequent call establishment flow.

4. The method of claim 3, further comprising:
the identity of the UE being a Globally Routable User Agent Uniform Resource Identifier (GRUU) of the UE;
when adding the identity into the redirected initial request message, the PNM AS modifying a request Uniform Resource Identifier (URI) therein to the GRUU of the configured UE; and
when processing the initial request for a terminating call of the configured UE, the redirection S-CSCF extracting the PUI of the configured UE from the GRUU and verifying validity of the PUI of the configured UE, and determining the registration address of the configured UE according to the GRUU.

5. The method of claim 3, further comprising:
the identity of the UE being a registration address of the UE;
when adding the identity into the redirected initial request message, the PNM AS adding the registration address of the configured UE into a head field of the redirected initial request message, and meanwhile modifying a request Uniform Resource Identifier (URI) in the redirected initial request message to a request URI of the configured UE; and
when processing the initial request for a terminating call of the configured UE, the redirection S-CSCF directly taking a registration address in the redirected initial request message as the registration address of the configured UE, or determining the registration address of the configured UE according to both the PUI and the registration address in the initial request message.

6. The method of claim 3, further comprising:
the identity of the UE being a personal mobile device identifier of the UE;
when determining to route the initial request message to the configured UE, the PNM AS adding the personal mobile device identifier of the configured UE into a head field of the redirected initial request message, and meanwhile modifying a request Uniform Resource Identifier (URI) in the redirected initial request message to a request URI of the configured UE;
when processing the initial request for a terminating call of the configured UE, the redirection S-CSCF determining the registration address of the configured UE according to the PUI and the personal mobile device identifier of the configured UE in the redirected initial request message.

7. A system for implementing a redirection service for User Equipments (UEs) sharing a Public User Identity (PUI), comprising UEs, a Serving Call Session Control Function (S-CSCF) in an Internet Protocol Multimedia Core Network Subsystem (IMS), and a Personal Network Management Application Server (PNM AS) connected to the S-CSCF, wherein,
the S-CSCF comprises:
a redirection trigger unit, used to invoke a terminating call service control logic to process an initial request message of a terminating call of a UE in a Personal Network (PN), to match with initial filter criteria, and to route the initial request message to the PNM AS; and
a redirection processing unit, used to uniquely locate a configured UE according to an identity or both the identity and a PUI in a redirected initial request message after receiving the redirected initial request message, and to invoke the terminating call service control logic to process the initial request for a terminating call of the configured UE;
the PNM AS comprises:
a storage unit, used to store a Private User Identity (PVI), a PUI, an identity and registration state information of a UE in a PN, as well as indication information of a configured UE in the PN; and
a redirection control unit, used to add an identity of a configured UE into a redirected initial request message and send the redirected initial request message to an original S-CSCF when determining to route an initial request message of a terminating call of a UE in a PN routed by the original S-CSCF to the configured UE with a shared PUI according to a configuration of the PN.

8. The system of claim 7, wherein,
the S-CSCF further comprises a first registration unit used to trigger a third party registration of a UE at the PNM AS when registering the UE in an IMS domain, and to send a PVI, PUI and identity of the UE to the PNM AS after receiving a subscribe request from the PNM AS; and
the PNM AS further comprises a second registration unit used to send a subscribe request for a registration event packet for registering a PUI to the S-CSCF after receiving the third party REGISTER request from the S-CSCF, and to establish a corresponding relationship among the PVI, PUI and identity of the UE in the storage unit after receiving a notify message returned by the PNM AS.

9. The system of claim 7, wherein,
the identity of the UE is a Globally Routable User Agent Uniform Resource Identifier (GRUU) of the UE;
when adding the identity into the redirected initial request message, the redirection control unit modifies a request Uniform Resource Identifier (URI) therein to a GRUU of the configured UE; and
when processing the initial request for a terminating call of the configured UE, the redirection processing unit extracts the PUI of the configured UE from the GRUU and verifies validity of the PUI of the configured UE, and determines a registration address of the configured UE according to the GRUU.

10. The system of claim 7, wherein,
the identity of the UE is a registration address of the UE;
when adding the identity into the redirected initial request message, the redirection control unit adds the registration address of the configured UE into a head field of the redirected initial request message, and meanwhile modifies a request Uniform Resource Identifier (URI) in the redirected initial request message to a request URI of the configured UE;
when processing the initial request for a terminating call of the configured UE, the redirection processing unit directly takes a registration address in the redirected initial request message as the registration address of the configured UE, or determines the registration address of the configured UE according to both the PUI and the registration address in the initial request message.

11. The system of claim 7, wherein,
the identity of the UE is a personal mobile device identifier of the UE;
when adding the identity into the redirected initial request message, the redirection control unit adds the personal mobile device identifier of the configured UE into a head field of the redirected initial request message, and meanwhile modifies a request Uniform Resource Identifier (URI) in the redirected initial request message to a request URI of the configured UE;
when processing the initial request for a terminating call of the configured UE, the redirection processing unit determines a registration address of the configured UE according to the PUI and the personal mobile device identifier of the configured UE in the redirected initial request message.

12. A method for implementing a redirection service for User Equipments (UEs) sharing a Public User Identity (PUI), using a unique identity to differentiate each UE with the shared PUI, comprising steps of:

1.1) in a registration process of a UE, a Personal Network Management Application Server (PNM AS) receiving a Private User Identity (PVI), a PUI and an identity of the UE and establishing a corresponding relationship among the PVI, PUI and identity of the UE;

1.2) the PNM AS adding the identity into a redirected initial request message in a session redirection process; and 1.3) a redirection Serving Call Session Control Function (S-CSCF) receiving the redirected initial request message and uniquely locating a configured UE according to the identity.

13. The method of claim 12, wherein,
the identity is generated by a network side and stored in the UE; or the identity is generated by the UE and stored in the UE.

14. The method of claim12, wherein,
the identity is a Globally Routable User Agent Uniform Resource Identifier (GRUU), a registration address of the UE, or a personal mobile device identifier.

15. The method of claim 12, further comprising:
an original S-CSCF sending an initial request message to the PNM AS between step 1.1) and step 1.2);
the PNM AS executing session redirection according to a configuration of a Personal Network (PN) in step 1.2); and
the original S-CSCF forwarding the redirected initial request message in step 1.3).

16. The system of claim 8, wherein,
the identity of the UE is a Globally Routable User Agent Uniform Resource Identifier (GRUU) of the UE;
when adding the identity into the redirected initial request message, the redirection control unit modifies a request Uniform Resource Identifier (URI) therein to a GRUU of the configured UE; and
when processing the initial request for a terminating call of the configured UE, the redirection processing unit extracts the PUI of the configured UE from the GRUU and verifies validity of the PUI of the configured UE, and determines a registration address of the configured UE according to the GRUU.

17. The system of claim 8, wherein,
the identity of the UE is a registration address of the UE;
when adding the identity into the redirected initial request message, the redirection control unit adds the registration address of the configured UE into a head field of the redirected initial request message, and meanwhile modifies a request Uniform Resource Identifier (URI) in the redirected initial request message to a request URI of the configured UE;
when processing the initial request for a terminating call of the configured UE, the redirection processing unit directly takes a registration address in the redirected initial request message as the registration address of the configured UE, or determines the registration address of the configured UE according to both the PUI and the registration address in the initial request message.

18. The system of claim 8, wherein,
the identity of the UE is a personal mobile device identifier of the UE;
when adding the identity into the redirected initial request message, the redirection control unit adds the personal mobile device identifier of the configured UE into a head field of the redirected initial request message, and meanwhile modifies a request Uniform Resource Identifier (URI) in the redirected initial request message to a request URI of the configured UE;
when processing the initial request for a terminating call of the configured UE, the redirection processing unit determines a registration address of the configured UE according to the PUI and the personal mobile device identifier of the configured UE in the redirected initial request message.

19. The method of claim 13, further comprising:
an original S-CSCF sending an initial request message to the PNM AS between step 1.1) and step 1.2);
the PNM AS executing session redirection according to a configuration of a Personal Network (PN) in step 1.2); and
the original S-CSCF forwarding the redirected initial request message in step 1.3).

20. The method of claim 14, further comprising:
an original S-CSCF sending an initial request message to the PNM AS between step 1.1) and step 1.2);
the PNM AS executing session redirection according to a configuration of a Personal Network (PN) in step 1.2); and
the original S-CSCF forwarding the redirected initial request message in step 1.3).

* * * * *